US005340909A

United States Patent [19]
Doerr et al.

[11] Patent Number: 5,340,909
[45] Date of Patent: Aug. 23, 1994

[54] POLY(1,3-PROPYLENE TEREPHTHALATE)

[75] Inventors: Marvin L. Doerr; Joseph J. Hammer; J. R. Dees, all of Charlotte, N.C.

[73] Assignee: Hoechst Celanese Corporation, Somerville, N.J.

[21] Appl. No.: 809,353

[22] Filed: Dec. 18, 1991

[51] Int. Cl.$^5$ ............................................. C08G 63/78
[52] U.S. Cl. ........................ 528/276; 528/272; 528/278; 528/279; 528/280; 528/283
[58] Field of Search ............... 528/272, 283, 276, 274, 528/275, 279, 280

[56] References Cited

U.S. PATENT DOCUMENTS

| | | | |
|---|---|---|---|
| 3,936,421 | 2/1976 | Hayashi et al. | 528/279 X |
| 4,329,444 | 5/1982 | Borman | 528/279 |
| 4,435,562 | 3/1984 | Sullivan et al. | 528/279 X |
| 4,471,108 | 9/1984 | Belder et al. | 528/272 |
| 4,540,771 | 9/1985 | Ambrose et al. | 528/272 |
| 4,546,169 | 10/1985 | Chandler et al. | 528/272 |
| 4,546,170 | 10/1985 | Barbee et al. | 528/272 X |
| 4,656,241 | 4/1987 | Iida et al. | 528/279 |
| 4,680,376 | 7/1987 | Heinze et al. | 528/279 |
| 4,780,527 | 10/1988 | Tong et al. | 528/279 X |
| 4,861,861 | 8/1989 | Gabatti | 528/272 |
| 5,017,680 | 5/1991 | Sublett | 528/279 X |
| 5,019,640 | 5/1991 | Engle-Badar et al. | 528/272 |
| 5,039,783 | 8/1991 | Brunelle et al. | 528/272 |
| 5,093,064 | 3/1992 | Utsumi et al. | 528/272 X |
| 5,106,944 | 4/1992 | Sublett | 528/279 |
| 5,166,310 | 11/1992 | Rooney | 528/279 X |

*Primary Examiner*—Judy M. Reddick
*Attorney, Agent, or Firm*—Philip P. McCann

[57] ABSTRACT

A process for producing poly(1,3-propylene terephthalate) from the reaction of either terephthalic acid or a lower dialkyl ester of terephthalic acid and 1,3-propanediol and polymerization of the monomer produced therefrom using a novel catalyst system. The novel catalyst composition includes employing an effective catalytic amount tin in the polycondensation reaction. Using the catalyst system and Hostaperm ® pigments allows for the production of poly(1,3-propylene terephthalate) having yellowness of less than 4 and an IV of at least 0.80 dl/g.

29 Claims, No Drawings

POLY(1,3-PROPYLENE TEREPHTHALATE)

FIELD OF THE INVENTION

The present invention relates to a process for producing poly(1,3-propylene terephthalate) (PPT) also commonly referred to as poly(trimethylene terephthalate), from terephthalic acid (TA) or a lower dialkyl ester of a terephthalic acid, and 1,3-propanediol. Using a specific catalyst system of the present invention allows one to conveniently produce the poly(1,3-propylene terephthalate) by either an ester interchange reaction or direct esterification followed by polycondensation. In particular, the polycondensation catalyst system comprises tin. More specifically, titanium or tin are used as catalysts for the ester interchange of the lower dialkyl ester of terephthalic acid and 1,3-propanediol while tin is used as the catalyst for the polycondensation stage. For direct esterification of TA and 1,3-propanediol, only the tin catalyst for polycondensation is required.

The poly(1,3-propylene terephthalate) of the present invention is demonstrated to have improved yellowness characteristics and can be produced at a higher intrinsic viscosity (IV). Due to the excellent elastic recovery, the PPT of the present invention can be used in racquet string application such as racquets used in various sports, including but not limited to tennis racquets and badminton racquets.

PRIOR ART

In prior art processes, PPT is produced in a batch type process by an ester interchange reaction plus polycondensation. In the ester interchange reaction, dimethyl terephthalate (DMT) and trimethylene glycol are typically reacted in the presence of a catalyst, for example titanium, at atmospheric pressure and at a temperature from about 155° C. to 245° C. In the presence of a catalyst, these components undergo ester interchange to yield an intermediate monomer and methanol. The reaction is conventionally done with about 1 mole DMT and from 1.20 to 2.20 moles of trimethylene glycol. It is recognized that although the art uses the term trimethylene glycol, it is the same as 1,3-propanediol used in the present invention. The reaction is completed by the removal of the methanol during the reaction. During the ester interchange, the intermediate monomer is the substantial majority product (not considering the methanol), along with small amounts of oligomers.

The resulting monomer is then polymerized by a polycondensation reaction, where the temperature is raised from about 240° C. to about 290° C. and the pressure is reduced to below 1 mm of mercury absolute pressure in the presence of a suitable polymerization catalyst, for example, titanium or antimony compound. From this reaction PPT and 1,3-propanediol are formed. Because the reaction is reversible, the 1,3-propanediol is removed as it is evolved, thus forcing the reaction toward the formation of the PPT.

Titanium is commonly the cited catalyst for ester interchange reaction for producing PPT. U.S. Pat. No. 3,671,379 to Evans et al discloses a process for producing PPT using a titanium catalyst compound for both the ester interchange and the polycondensation reactions. The catalyst compound is a mixture of sodium dissolved in a solution of n-butanol, and an extremely high level of tetrabutyl titanate (>1300 ppm based on DMT). A similar disclosure is found in U.S. Pat. No. 3,350,871 to Pierce et al and U. K. Patent Specification 1,075,689.

U.S. Pat. No. 2,465,319 to Whinfield et al discloses a process for producing PPT using sodium and clean magnesium ribbon.

A paper entitled "Preparation and Properties of Poly(methylene terephthalates)," published in the Journal of Polymer Science: Part A-1, Volume 4, 1851–1859 (1966) discloses the use of a very high level of tetraisopropyl titanate (from 890 to 1030 ppm on DMT) as the catalyst for the polymerization.

A paper entitled "Preparation and Characterization of Poly(ethylene/Trimethylene Terephthalate) Copolyester," published in the J. Macromol. Sci.-Chem., A22(3), pp 373–378 (1985) discloses the use of antimony trioxide and zinc acetate as the catalyst for the preparation of the copolyester.

It is known in the art to use tin as a catalyst to prepare poly(ethylene terephthalate) (PET) but the use of tin results in an extremely discolored yellow-brown polymer. For this reason tin is not a preferred catalyst for the preparation of poly(ethylene terephthalate).

PPT polymer fibers have numerous property differences from two common homologous terephthalate polyesters, PET and poly (1,4-butylene terephthalate) (PBT). Fully drawn PPT yarn has excellent elasticity (recovery and resilience). However, use of PPT yarn has been limited by color problems and failure to have a process to produce PPT having useful molecular weight, defined as intrinsic viscosity of at least 0.80 dl/g (deciliters/gram) measured at 25° C. using orthochlorophenol as a solvent at 25° C.

It is an aim of the present invention to not only feasibly produce PPT from available raw materials but produce a PPT that has acceptable color.

SUMMARY OF THE INVENTION

The present invention provides a unique process of preparing poly(1,3-propylene terephthalate) by effecting the ester interchange or direct esterification and polycondensation reactions through the use of a unique catalyst system. In particular, the present invention comprises a process for making poly(1,3-propylene terephthalate) wherein the catalyst of a tin compound is employed in the polycondensation reaction.

In the broadest sense, the present invention comprises a method for making poly(1,3-propylene terephthalate) from either terephthalic acid (TA) or a lower dialkyl ester of terephthalic acid (LDE) and 1,3-propanediol comprising the steps of: reacting the 1,3-propanediol with the LDE or TA at a mole ratio of about 1.4/1, at a suitable temperature and pressure sufficient to produce a monomer and a byproduct; removing the resulting byproduct to more completely react the LDE or TA and 1,3-propanediol; reducing the pressure sufficiently to initiate polycondensation; polymerizing the resulting monomer at a suitable temperature and vacuum and in the presence of an effective amount of tin catalyst.

The present invention also comprises a monofilament fiber made from the poly(1,3-propylene terephthalate) made by the above-mentioned process and articles containing such monofilament fibers.

The present invention also comprises numerous uses of the poly(1,3-propylene terephthalate) of the present invention including but not limited to racquet strings, composite matrices, carpets, films, guitar strings, fishing line, angioplasty catheters tubes, etc.

DESCRIPTION OF THE PREFERRED EMBODIMENTS

Poly(1,3-propylene terephthalate) of the present invention is prepared from either terephthalic acid (TA) or a lower dialkyl ester of terephthalate acid (LDE), and 1,3-propanediol. Suitable LDE's include dimethyl terephthalate, diethyl terephthalate, dipropyl terephthalate, dibutyl terephthalate, dialkyl naphthalates such as 2,6-dimethyl naphthalate, or mixtures of two or more of these.

1,3-propanediol is commercially available from Degussa Corporation or may be prepared in accordance with disclosures found in U.S. Pat. Nos. 4,873,378; 4,873,379; and 4,935,554. Preferably, the 1,3-propanediol should have the following properties: at least 99.0% purity; less than 1000 ppm total carbonyls as proprionaldehyde; less than 0.3 weight % water; and less than 1 ppm iron. Also, it is preferred that a 50:50 blend of 1,3-propanediol and distilled water has a pH of from 6.5 to 7.5.

The catalyst system used in the present invention depends on whether TA or LDE is used in the initial reaction. If TA is reacted with 1,3-propanediol in direct esterification then 0 to about 125 ppm of titanium may be used, or from 0 to about 650 ppm tin based on TA. If a LDE is reacted with 1,3-propanediol in an ester interchange reaction then from about 10 ppm to 30 ppm titanium or from about 100 ppm to about 250 ppm tin based on LDE is used in the ester interchange reaction. The foregoing reactions result in a monomer to be polymerized or polycondensed.

In the polycondensation reaction, the catalyst system used includes from about 100 ppm to about 525 ppm of tin based on LDE or from about 100 to about 650 ppm of tin based on TA. It is recognized that the tin used in total process is cumulative, i.e., the total amount of tin being that used in both the initial reaction and polycondensation reaction. All the tin can be put in with the raw materials prior to the initial reaction of either ester interchange or direct esterification or the tin can be effectively added in parts; one part before the ester interchange or direct esterification and the second amount added before the polycondensation. The amount of tin represented for the polymerization reaction represents the cumulative amount used in the total reaction.

In addition to the tin in the polycondensation reaction, it has been found that certain Hostaperm ® pigments lower the yellow index of the PPT. Hostaperm ® is a registered trademark of Hoechst Aktiengesellschaft. In particular, it has been found that certain Hostaperm ® pigments significantly affect the yellow properties of PPT, much more than the affect it has on PET and PBT. In particular, as shown in the examples, addition of Hostaperm ® pigments to PET only lowers the yellow index b* about 2 points; for PBT, the addition of Hostaperm ® pigments lowers the yellow index b, about 4 points; but for PPT, Hostaperm ® lowers the yellow index b* about 8 points on the CIELAB scale.

Preferred Hostaperm ® pigments are a mixture of 75% C.I. Pigment Violet 23 (Bluish violet) with 25% C.I. Pigment Blue 15 (Bright blue). C.I. Pigment Violet 23 is a carbazole pigment and has CAS number 6358-30-1. C.I. Pigment Blue 15 is a phthalocyanine pigment and has CAS number 147-14-8. Amounts of total Hostaperm ® pigments included with the tin catalyst are from about 1 ppm to about 4 ppm based on LDE or TA. The Hostaperm ® pigments are added before polycondensation and preferably with the initial TA or LDE charge of raw materials.

This catalyst system, when used in the most effective amounts, provides a poly(1,3-propylene terephthalate) having an IV of at least 0.80 and a commercially acceptable color of a yellowness of equal to or less than 4 on the 1976 CIELAB L*a*b* scale. By "IV" or "intrinsic viscosity" is meant the reduced viscosity of the polymer at zero concentration, which may be determined by measuring the flow times of a polymer solution after successive dilutions with fresh solvent, calculating the reduced viscosities, and extrapolating a plot of the reduced viscosities against concentration to zero concentration. The reduced viscosity is obtained from the expression:

$$\left[ \frac{\text{Flow time of polymer solution}}{\text{Flow time of solvent}} - 1 \right] \times \frac{1}{c}$$

where c is the concentration expressed as grams of polymer per 100 ml of solvent. As used here, the intrinsic viscosity was measured in a modified Ostwald viscometer using orthochlorophenol as a solvent at 25° C.

Generally, the Sn or Ti compound is added before the beginning of the ester interchange reaction. Sn is added subsequent to the ester interchange and before the beginning of or during polymerization as explained more fully later and is a catalyst for the polycondensation reaction.

Although metals are described for the catalyst system of the present invention, the catalyst may be added in the form of many different compounds. Such compounds include tetrabutyl titanate (TBT), tetraisopropyl titanate (TPT), butylstannoic acid (BSA) commercially available as Fascat 4100 from Atochem, butyltin tris (2-ethylhexoate), stannous octoate, dibutyltin oxide and methylene bis(methyltin oxide).

Other additives may be included in the general procedure outlined above such as coloring agents, delustrants, opaquing agents, thermal and UV stabilizers, etc. These additives do not add or detract from the present invention.

The present invention includes either the ester interchange reaction or direct esterification. In the ester interchange reaction, LDE and 1,3-propanediol are reacted in a batch process at a temperature of 155° C. to 245° C. at approximately atmospheric pressure or below in an ester interchange reaction to produce a monomer and an alcohol. The LDE and 1,3-propanediol are reacted in the presence of at least one catalyst selected from the group consisting of tin and titanium and are generally reacted in the mole ratios of 1,3-propanediol to LDE of about 1.4/1. Because the ester interchange is reversible, it is necessary to remove the formed alcohol to assure that the reaction favors the formation of the monomer.

In the direct esterification reaction, TA and 1,3-propanediol are reacted in a batch process at a temperature of about 200° C. to 260° C. at a pressure ranging from approximately atmospheric to about 100 psig to produce a monomer and water. The TA and 1,3-propanediol may be reacted in the presence of a suitable catalyst such as tin or titanium and are generally reacted in the mole ratio of 1,3-propanediol to TA of about 1.4/1. Amounts of titanium may range from 0 to about 125 ppm and tin may range from 0 to about 650 ppm of TA. As with the ester interchange, water is removed to assure completion of the reaction.

At the end of the ester interchange or direct esterification reaction the monomer is then subjected to a polycondensation reaction to yield poly(1,3-propylene terephthalate) and 1,3-propanediol. The polycondensation reaction occurs at a temperature range of between 240° C. to 290° C. at an absolute pressure of approximately 0.1 to 3.0 mm of mercury. This reaction is performed in the presence of tin catalyst in the amount from about 100 to about 650 ppm based on TA or about 100 to about 525 ppm based on LDE. This reaction is reversible and, therefore, the 1,3-propanediol is continuously removed to force the completion of the reaction toward production of poly(1,3-propylene terephthalate). It is necessary to reduce the pressure from that of the previous reaction to what is required for the polycondensation. This time period is typically called the vacuum-let-down time. It is preferred to add the tin catalyst for the polycondensation reaction before the start of the vacuum-let-down in those situations where opening the reaction vessel would break the vacuum, necessitating re-starting the vacuum-let-down.

Generally, using an amount of any one of the catalysts which is outside the ranges of the present invention is not desirable. Using an amount less than the minimum stated for any of the catalyst generally yields a result which is not as substantial as that obtained with the present invention. Using an amount more than the maximum stated for any of the catalysts produces undesirable effects such as poor color, unwanted side products, higher cost, etc.

It is known in the art to increase the IV of a condensation polymer by well known techniques such as solid-state polymerization.

PPT manufactured in accordance with the present invention can be spun into monofilament form in various ways well known to those skilled in the art. Generally, such PPT polymer is cut into chip form and dried to have less than 50 ppm water and preferably less than about 20 ppm water based on the weight of the polymer. The PPT chip is then melted in an extruder at about 258° C. and extruded at a rate from about 300 to about 9000 grams per hour through 1 or more orifices of a diameter from about 0.5 mm to about 1.5 mm to form 1 or more continuous monofilament lines. The polymer is extruded under a pressure from 50 to 2000 psig.

Subsequent to extrusion, the monofilaments enter a quench tank of water having a temperature from about 25° C. to about 50° C. The monofilament then runs through a set of rolls, having from 2 to 4 rollers running with a speed of 10 to 25 meters per minute. The monofilaments then pass through a second water tank containing water having a temperature between 50° C. and 80° C. The monofilaments then are passed through two sets of rollers and one water tank located between the sets of rollers. Then the monofilaments are passed through a double heat zone, the first at about 100° C. and the second at about 150° C. Then the monofilaments pass over another set of rolls, afterwards, they are wound on separate bobbins. Roll speeds are dependent upon spinning conditions. Further details of the spinning process and properties of the monofilament are provided in the following Examples.

EXPERIMENTAL PROCEDURE

Autoclave batches were prepared in which batches of roughly 825 grams of polymer for Example 1, Experiments 1-5, were produced at approximately 1.4 to 1 mole ratio of 1,3-propanediol (PDO) to dimethyl terephthalate (DMT) in a batch process, while batches of roughly 170 and 1700 pounds of polymer for Examples 2 and 3 respectively were produced from about 1.4 to 1 mole ratio of PDO/DMT. In each case, the autoclave was first charged with the raw materials including DMT, PDO and the catalyst and additives used for the particular experiment. The autoclave was then heated from 200° C. to 230° C. at atmospheric pressure where initiation of the ester interchange begins at from about 155° C. to 180° C.

During the charging of the raw materials, the autoclave was purged with an inert gas (nitrogen purge at 3–6 psi) to aid in preventing oxidation. Generally, the autoclave was agitated with a stirrer to assure homogenous mixing of the raw materials. At the start of the ester interchange reaction (approximately when the reactor contents reached 165° C.), the flow of nitrogen gas was terminated and the starting time was recorded. The autoclave temperature during ester interchange rose from an "average" value of approximately 165° C. to from about 225° C. to about 245° C. During the ester interchange, the methanol was continuously removed to force the reaction toward the production of the monomer.

For Examples 1 and 2, polycondensation was performed in the same autoclave while in Example 3, the monomer was transferred to a separate vessel capable of having a vacuum pulled thereon.

The catalysts for the ester interchange reaction and polycondensation were added in the amounts indicated in the examples. Nitrogen gas was terminated when the methanol evolution began. When completed, vacuum-let-down was initiated. During vacuum-let-down, a vacuum is drawn on the autoclave until a vacuum of about 1.0 mm of mercury or lower is achieved. At the end of vacuum-let-down, the batch temperature was elevated to from about 240° C. to about 290° C., thereby initiating the polycondensation reaction. The polycondensation reaction proceeded until substantial completion, during which the 1,3-propanediol formed was removed. Time for the polycondensation was recorded at the end of vacuum-let-down.

Example 1, Experiment 6 illustrates the production of PPT polymer starting with TA. An autoclave batch of roughly 29 pounds of PPT monomer was prepared using approximately 1.5 to 1 mole ratio of PDO to TA in a batch process. The autoclave was first charged with the raw materials, TA and PDO. The autoclave was then heated to 240° C. and pressurized to 50 psig where initiation of the direct esterification started. After direct esterification completion, a polycondensation catalyst was added to the produced monomer, which was then polymerized using the process used to polymerize LDE-based monomer.

Once the PPT was formed, it was tested for intrinsic viscosity (IV) and color. The color test was done in accordance with ASTM Method E308-85. The IV was tested using orthochlorophenol solvent at 25° C. in which 8 grams of the PPT was dissolved in 100 ml of the solvent.

PPT manufactured in accordance with the present invention can be spun into monofilament form in various ways well known to those skilled in the art. Generally, such PPT is cut into chip form and dried to have less than 50 ppm water preferably less than 20 ppm water based on polymer weight. The PPT chip is then melted in an extruder at about 258° C. and extruded at a rate from about 6000 to about 9000 grams per hour through 20 orifices of a diameter from about 0.5 mm to about 1.5 mm to form 20 continuous monofilament lines. The polymer is extruded under a pressure from 50 to 200 psig.

Subsequent to extrusion, the monofilaments enter a quench tank of water having a temperature from about 25° C. to about 50° C. The monofilaments then run through a set of rolls, having from 2 to 4 rollers running with a speed of 10 to 25 meters per minute. The monofilaments then pass through a second water tank containing water having a temperature between 50° C. and 80° C. The monofilaments then are passed through two sets of rollers and one water tank located between the sets of rollers. Then the monofilaments are passed through a double heat zone, the first at about 100° C. and the second at about 150° C. Then the monofilaments pass over another set of rolls, afterwards, they are wound on separate bobbins. Further details of the spinning process and properties of the monofilaments are provided in the following Examples.

EXAMPLE 1

Various catalyst systems were employed to demonstrate the advantages of the system used in the present invention. Control experiments 1-4 depicting the prior art were included to demonstrate the subtle differences and effects of the incorporation of the various catalysts in the ester interchange and polycondensation reactions of the present invention. In particular, control experiments replicated various prior art citations. In Control Experiment 1, titanium was used in both reactions. In particular, a vessel was charged with 777 g DMT, 415 of PDO and 0.272 g of tetrabutyl titanate (Tyzor ® TBT) (i.e., 350 ppm on DMT). The vessel was then nitrogen purged, temperature set at 220° C. and the contents of the vessel were agitated. When the ester interchange reaction started the nitrogen was discontinued. The time for the ester interchange reaction was 70 minutes. Upon completion of ester interchange, vacuum-let-down was conducted to 3.0 mm over 30 minutes, then lowered to 0.3 mm over 10 minutes. When completed, batch temperature was raised to 250° C. and polycondensation was continued for 220 minutes. Properties of the PPT are found in Table 1.

Control Experiment 2 was prepared using a similar method. The vessel was charged with 777 g DMT, 457 g PDO and 0.194 g Zn(OAc)$_2$·2H$_2$O (250 ppm on DMT). Upon completion of ester interchange reaction, 0.272 g Sb$_2$O$_3$ (350 ppm on DMT) was added and the monomer polymerized at 280° C. to maximize IV.

Control Experiment 3 was prepared using the methodology of control experiments 1 and 2. The vessel was charged with 777 g DMT, 647 g PDO and 14 ml catalyst solution comprising of 0.5 g Na and 7.4 g TBT diluted to 100 ml with n-butyl alcohol such that there were more 90 ppm Na on DMT and 1333 ppm TBT on DMT. Polymerization temperature was 250° C. and, in spite of very high Ti level, 6 hours was required to achieve maximum IV. Properties of the PPT are found in Table 3.

Similar to the methodologies of control experiment 1, 2, and 3, Control Experiment 4 was prepared by charging into a vessel 777 g DMT, 321 g PDO, 0.556 g Zn(OAc)$_2$·2H$_2$O (715 ppm on DMT) and 0.133 g Sb$_2$O$_3$ (172 ppm on DMT). Maximum EI temperature was 230° C. and polycondensation temperature was 270° C. for 3 hours.

TABLE 1

|  | CONTROL EXPERIMENT | | | | EXPERIMENT | |
|---|---|---|---|---|---|---|
|  | 1 DMT | 2 DMT | 3 DMT | 4 DMT | 5 DMT | 6 TA |
| Mole Ratio | 1.36 | 1.50 | 2.10 | 1.06 | 1.40 | 1.5 |
| EI Catalysts | Ti | Zn | Na,Ti | Zn | Ti | — |
| PC Catalyst | Ti | Sb | Ti | Sb | Sn | Sn |
| Polycondensation Time, min | 220 | 200 | 360 | 180 | 125 | 120 |
| IV, dl/g | 0.59 | 0.57 | 0.82 | 0.23 | 0.85 | 0.90 |
| L* | 90 | 87 | 87 | 92 | 92 | 89 |
| b* | 4 | 8 | 14 | 8 | 6 | 9 |

It was the aim of the present Experiment 6 to illustrate that high IV PPT could be prepared by using tin only as the polycondensation catalyst and no catalyst was used in the direct esterification reaction.

Control Experiment 1–4 had properties as shown in Table 1. Polymers resulting from Experiments 1, 2, and 4 all had very low IV which would give commercially unacceptable fibers having very low strength and tenacity. Polycondensation time for Experiment 3 was 6 hours to attain acceptable IV. This time requirement is significantly high. However, producing PPT according to the present invention as shown in Experiments 5 and 6 results in PPT having a polycondensation time of about 2 hours. Also, the mole ratio of PDO/DMT and PDO/TA are significantly lower than that of the PDO/DMT used in Control Experiment 3.

EXAMPLE 2

The Experimental Procedure previously described was followed in this example, except the batch size of the PPT produced was increased to about 170 pounds. For comparative purposes, various ester interchange and polycondensation catalyst systems were used resulting in various properties of the PPT polymer. The mole ratio of PDO/DMT was held constant at about 1.4.

In Experiments 1 and 2, the ester interchange catalyst system consisted of 100 ppm Tyzor ® TBT plus 100 ppm Co(OAc)$_2$·4H$_2$O (CoAc) in Experiment 1 and 50 ppm CoAc in Experiment 2. For polycondensation catalyst, 300 ppm Sb$_2$O$_3$ and 100 ppm butyl stannoic acid (BSA) were used in both Experiments. In Experiment 2, 1.5 ppm Hostaperm ® pigments were added.

For Experiments 3 and 4, the catalyst used are shown in Table 2. No Hostaperm ® pigments were used in either Experiment 3 or 4.

Experiments 5 and 6 each contained tin catalysts and Hostaperm ® pigments. Tridecyl phosphite (TDP), a thermal stabilizer, was added in all six Experiments.

The results of Example 2 are set forth in Table 2.

TABLE 2

| EXPERIMENT | 1 | 2 | 3 | 4 | 5 | 6 |
|---|---|---|---|---|---|---|
| PDO/DMT | 1.4 | 1.4 | 1.4 | 1.4 | 1.4 | 1.4 |

TABLE 2-continued

| EXPERIMENT | 1 | 2 | 3 | 4 | 5 | 6 |
|---|---|---|---|---|---|---|
| MOLE RATIO | | | | | | |
| EI CATALYST, PPM | 100 CoAc 100 TBT | 50 CoAc 100 TBT | 250 BSA | 40 CoAc 100 TBT | 50 CoAc 100 TBT | 40 CoAc 100 TBT |
| HOSTAPERM ®, PPM | — | 1.5 | — | — | 1.5 | 1.5 |
| EI TIME, HR | 3.7 | 3.8 | 5.2 | 3.5 | 3.8 | 4.8 |
| EI MAX TEMP, °C. | 235° | 239° | 241° | 234° | 240° | 238° |
| PC CATALYST, PPM | 300 $Sb_2O_3$ 100 BSA | 300 $Sb_2O_3$ 100 BSA | 500 BSA | 450 BSA | 450 BSA | 450 BSA |
| TDP, PPM | 500 | 500 | 500 | 450 | 500 | 450 |
| PC TIME, HR | 8.3 | 3.6 | 5.1 | 4.3 | 4.3 | 5.7 |
| PC TEMP, °C. | 252° | 260° | 252° | 254° | 253° | 252° |
| IV, dl/g | 0.67 | 0.71 | 0.84 | 0.83 | 0.85 | 0.85 |
| L* | 86 | 84 | 88 | 84 | 87 | 86 |
| b* | 12 | 1 | 12 | 10 | 1 | 3 |

These experiments show that when a well-known PET catalyst $Sb_2O_3$ is used as the primary polycondensation catalyst, useful IV of the PPT is not achieved. Experiments 1 and 2 illustrate this.

Experiments 3 and 4 show that the use of a tin polycondensation gives acceptable IV but the absence of the Hostaperm ® pigments result in yellow polymer as shown by high b*.

It is noted that PPT polymer produced in accordance with Experiments 5 and 6 have a IV of at least 0.80 and a yellow b* of less than 4.

EXAMPLE 3

The Experimental Procedure previously described was followed in this example, except the batch size of the PPT produced was increased to about 1700 pounds. The polymerization time of the batch was about 4.3 hours plus about 1 hour for vacuum let-down.

The results of Example 3 are set forth in Table 3.

TABLE 3

| PDO/DMT MOLE RATIO | 1.40 |
|---|---|
| EI CATALYST TBT, ppm | 125 |
| HOSTAPERM ®, ppm | 3 |
| PC CATALYST BSA, ppm | 500 |
| $TiO_2$, wt. % | 0.28 |
| TDP, ppm | 400 |
| POLYCONDENSATION TIME, HOURS | 4.3 |
| POLYCONDENSATION TEMP., °C. | 253 |
| IV, dl/g | 0.84 |
| L* | 83 |
| b* | 4 |

EXAMPLE 4

This example is included to show the unexpected result that Hostaperm ® pigments have on the yellowness of PPT as compared to PET and PBT, two other polyesters. Control Experiments 1 and 2 are PET wherein Control Experiment 2 contains Hostaperm ® pigments. Likewise, Control Experiment 3 and 4 and PBT with Hostaperm ® pigments added to Control Experiment 4. Experiments 5 and 6 are PPT polymers with Experiment 6 containing the Hostaperm ® pigments. MnAc refers to $Mn(OAc)_2 \cdot 4H_2O$ a common PET ester interchange catalyst.

The result of Example 4 are set forth in Table 4.

TABLE 4

| | CONTROL EXPERIMENT | | | | EXPERIMENT | |
|---|---|---|---|---|---|---|
| | 1 | 2 | 3 | 4 | 5 | 6 |
| DIOL/DMT MOLE RATIO | 2.2 | 2.2 | 1.4 | 1.4 | 1.4 | 1.4 |
| DIOL | ETHEYLENE GLYCOL | EHTYLENE GLYCOL | 1,4-BUTANEDIOL | 1,4-BUTANEDIOL | 1,3-PROPANEDIOL | 1,3-PROPANEDIOL |
| EI TIME, HR | 3.92 | 3.00 | 1.17 | 2.33 | 3.50 | 4.75 |
| EI MAX TEMP, °C. | 221 | 220 | 224 | 216 | 234 | 238 |
| EI CATALYST, ppm | 170 MnAc 40 CoAc | 170 MnAc 40 CoAc | 150 TBT 40 CoAc | 150 TBT 40 CoAc | 100 TBT 40 CoAc | 100 TBT 40 CoAc |
| HOSTAPERM ® | 0 | 1.5 | 0 | 1.5 | 0 | 1.5 |
| PC CATALYST, ppm | 450 $Sb_2O_3$ | 450 $Sb_2O_3$ | 270 TBT | 270 TBT | 450 BSA | 450 BSA |
| POLY TIME, HR | 2.00 | 1.92 | 4.17 | 2.75 | 4.33 | 5.67 |
| PC MAX TEMP, °C. | 284° | 285° | 252° | 252° | 254° | 252° |
| IV, dl/g | 0.59 | 0.59 | 0.81 | 0.78 | 0.83 | 0.85 |
| L* | 77.1 | 78.5 | 93.3 | 90.3 | 84.0 | 85.9 |
| b* | 1.9 | −0.2 | 0.3 | −4.1 | 10.1 | 2.7 |

In particular, as shown in TABLE 4, addition of Hostaperm ® pigments results in a significant improvement in the color of the PPT polymer when compared to PET and PBT polymers. Addition of Hostaperm ® pigments to PPT lowers the yellow index b* by about 7.4 points as compared to only 2.1 points for PET and 4.4 points for PBT.

EXAMPLE 5

PPT manufactured in accordance with Example 3 herein was solid state polymerized, spun into monofilaments and then formed into racquet strings for tennis racquets. The PPT was solid-state polymerized in a jacketed 1000 pound tumble dryer, equipped with vacuum pumps and a hot oil heating system. PPT chip is charged into the dryer, maximum temperature is set, vacuum and tumbling are started in accordance with the following parameters.

| Dryer Temperature °C. | 216° C. |
|---|---|
| Dryer Vacuum, mmHg | 0.1 |
| Exposure time, hr | 18 |
| Final IV, dl/g | 1.05 |

PPT chip having an intrinsic viscosity of 1.05 dl/g (as measured at 25° C. in a solution of 8 gram PPT in 100 ml of orthochlorophenol solvent) was dried under nitrogen. This chip, still blanketed under nitrogen, was melted in an extruder at 258° C. and extruded at a rate of 8,300 grams per hour though 20 orifices of 0.80 mm in diameter to form 20 continuous monofilament lines. The polymer was extruded under 82 psig pressure.

From the extruder, the monofilaments enter a 36° C. water quench bath. After the quench tank, the monofilaments run through a trio of rolls running at 20 meters per minute. The monofilaments then pass through a stretch tank filled with water at 70° C. From this tank, the monofilaments then pass through a set of rolls running at 91.4 meters per minute. The monofilaments then pass through another stretch tank filled with water at 72° C. After this stretch tank, the monofilaments pass through a set of rolls running at 104.3 meters per minute. The monofilaments then pass through a double zone heater. In the first zone of the heater, air at 100° C. is blown over the monofilaments. In the second zone, the monofilaments are heated to 155° C. using Infra-Red heaters. After leaving the heater, the monofilaments pass through a trio of rolls running at 100.0 meters per minute. After the twenty monofilaments pass through these rolls, they are taken up on twenty separate bobbins.

The physical properties of the PPT monofilament spun under these conditions are as follows:

| Mean diameter | 0.25 mm |
|---|---|
| Denier | 657 |
| Break Strength | 2037 g |
| Tenacity | 3.10 g/den |
| Elongation at break | 35% |
| Load at 10% Elongation | 1.3 g/den |
| Young's Modulus | 24.6 g/den |

The PPT monofilament with a denier of 657 has a lower Young's Modulus and a higher elongation at break than either Nylon 6 with denier of 378 or Nylon 66 with a denier of 372. Both of these attributes are attractive for racquet string applications.

Multiple lengths of PPT monofilament are required to construct one length of racquet string. The multiple lengths of monofilament will be bonded together using a polymer coating. The coating may be applied as either molten polymer or polymer dissolved in a suitable solvent. The polymer coating may or may not be PPT.

Thus, it is apparent that there has been provided, in accordance with the invention, a catalyst system in combination with a method of preparing poly(trimethylene terephthalate) from terephthalic acid or a lower dialkyl ester of a terephthalic acid and 1,3-propanediol using the catalyst system that fully satisfies the objects, aims and advantages as set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations that fall within the sphere and scope of the invention.

That which is claim is:

1. A process for making poly(1,3-propylene terephthalate) comprising steps of:
   a) reacting terephthalic acid or, dimethyl terephthalate, and 1,3-propanediol to produce a monomer and reaction byproduct;
   b) removing said reaction byproduct during said reaction;
   c) polymerizing the monomer by a polycondensation reaction to produce poly(1,3-propylene terephthalate) and 1,3-propanediol; and
   d) removing said 1,3-propanediol during the polycondensation reaction;
   wherein the improvement comprises adding an effective catalytic amount of tin for the polycondensation reaction.

2. The process of claim 1 wherein said 1,3-propanediol has the following properties:
   at least 99.0% purity;
   less than 1000 ppm total carbonyls measured as proprionaldehyde;
   less than 0.3 weight % water;
   and less than 1 ppm iron.

3. The process of claim 2 wherein said 1,3-propanediol has the following property:
   a Ph of from 6.5 to 7.5 in a 50:50 blend of 1,3-propanediol and distilled water.

4. The process of claim 1, wherein said tin is present in a range from about 100 ppm to about 525 ppm based on DMT.

5. The process of claim 1, wherein said tin is present in a range from about 100 ppm to about 650 ppm based on terephthalic acid.

6. The process of claim 1, wherein the polycondensation reaction occurs in a temperature range from about 240° C. to about 290° C. and at a pressure of from 0.1 to about 3.0 mm mercury.

7. A process for making poly(1,3-propylene terephthalate) comprising the steps of:
   a) reacting terephthalic acid or, dimethyl terephthalate and 1,3-propanediol to produce a monomer and a reaction byproduct;
   b) removing said reaction byproduct during said reaction;
   c) polymerizing the monomer by a polycondensation reaction to produce poly(1,3-propylene terephthalate) and 1,3-propanediol; and
   d) removing said 1,3-propanediol during the polycondensation reaction;
   wherein the improvement comprises adding an effective catalytic amount of a catalyst selected from the group consisting of titanium and tin before reaction a); and adding an effective catalytic amount of tin before the polycondensation reaction.

8. The process of claim 7 wherein said 1,3-propanediol has the following properties:
   99.0% purity;
   less than 1000 ppm total carbonyls measured as proprionaldehyde;
   less than 0.3 weight % water; and
   less than 1 ppm iron.

9. The process of claim 8 wherein said 1,3-propanediol has the following property:

a Ph of from 6.5 to 7.5 in a 50:50 blend of 1,3-propanediol and distilled water.

10. The process of claim 7, wherein said dimethyl terephthalate (DMT) and said 1,3-propanediol are reacted by an ester interchange reaction.

11. The process of claim 10, wherein said ester interchange reaction occurs at a temperature range of from about 155° C. to about 245° C. and at atmospheric pressure or less.

12. The process of claim 10, wherein the mole ratio of 1,3-propanediol to dimethyl terephthalate is about 1.4 to 1.

13. The process of claim 10, wherein the polycondensation reaction occurs at a temperature range of from about 240° C. to about 290° C. and at a pressure of from about 0.1 to about 3.0 mm mercury.

14. The process of claim 10, wherein titanium is used as the catalyst in the ester interchange reaction.

15. The process of claim 14, wherein said titanium is present in a range from about 10 ppm to about 30 ppm and said tin is present in a range from about 100 ppm to about 250 ppm wherein all amounts are based on the dimethyl terephthalate.

16. The process of claim 15, wherein an effective catalytic amount of cobalt salt is added before said ester interchange reaction.

17. The process of claim 7 wherein terephthalic acid is reacted with the 1,3-propanediol by direct esterification.

18. The process of claim 17 wherein said direct esterification occurs at a temperature range of from about 200° C. to about 260° C. and at a pressure ranging from about atmospheric pressure to about 100 psig.

19. The process of claim 17 wherein the mole ratio of 1,3-propanediol to terephthalic acid is about 1.4 to 1.

20. The process of claim 17 wherein the polycondensation reaction occurs at a temperature range of from about 240° C. to about 290° C. and at a pressure of from about 0.1 to about 3.0 mm mercury.

21. The process of claim 17 wherein titanium is used as the catalyst in the direct esterification, wherein titanium is present in the range from about 1 ppm to about 125 ppm and said tin for the polycondensation reaction is present in the range from about 100 ppm to about 650 ppm wherein all amounts are based on terephthalic acid.

22. A process for making poly(1,3-propylene terephthalate) comprising steps of:
 a) reacting terephthalic acid or dimethyl terephthalate and 1,3-propanediol to produce a monomer and reaction byproduct;
 b) removing said reaction byproduct during said reaction;
 c) polymerizing the monomer by a polycondensation reaction to produce poly(1,3-propylene terephthalate) and 1,3-propanediol; and
 d) removing said 1,3-propanediol during the polycondensation reaction;
 wherein the improvement comprises adding an effective catalytic amount of catalyst selected from the group consisting of titanium and tin before reaction a); and adding an effective catalytic amount of tin and an effective amount of pigments before the polycondensation reaction.

23. The process of claim 22 wherein said dimethyl terephthalate and said 1,3-propanediol are reacted by an ester interchange reaction.

24. The process of claim 23 wherein said ester interchange reaction occurs at a temperature range of from about 155° C. to about 245° C. and at atmospheric pressure or less.

25. The process of claim 22 wherein terephthalic acid is reacted with the 1,3-propanediol by direct esterification.

26. The process of claim 25 wherein said direct esterification occurs at a temperature range of from about 200° C. to about 260° C. and at a pressure ranging from about atmospheric pressure to about 100 psig.

27. The process of claim 25 wherein the mole ratio of 1,3-propanediol to terephthalic acid is about 1.4 to 1.

28. The process of claim 25 wherein the polycondensation reaction occurs at a temperature range of from about 240° C. to about 290° C. and at a pressure of from about 0.1 to about 3.0 mm mercury.

29. The process of claim 25 wherein titanium is used as the catalyst in the direct esterification, wherein titanium is present in the range from about 1 ppm to about 125 ppm and said tin for the polycondensation reaction is present in the range from about 100 ppm to about 650 ppm wherein all amounts are based on terephthalic acid.

* * * * *